United States Patent [19]
Littrell

[11] Patent Number: 5,907,936
[45] Date of Patent: Jun. 1, 1999

[54] ELECTRICAL FLOOR HATCH AND WIRING SYSTEM FOR A CONCRETE FLOOR STRUCTURE

[75] Inventor: Gary L. Littrell, Inverness, Ill.

[73] Assignee: Thomas & Betts Corporation, Memphis, Tenn.

[21] Appl. No.: 08/636,502

[22] Filed: Apr. 25, 1996

[51] Int. Cl.⁶ .................................................... E04B 5/48
[52] U.S. Cl. .......................................... 52/220.5; 174/49
[58] Field of Search ............................. 52/220.4, 220.5, 52/126.2, 414; 174/48, 49

[56] References Cited

U.S. PATENT DOCUMENTS

| | | |
|---|---|---|
| 3,721,051 | 3/1973 | Fork . |
| 3,886,702 | 6/1975 | Fork ................................. 52/220.45 X |
| 3,903,666 | 9/1975 | Fork ...................................... 52/220.4 |
| 3,932,696 | 1/1976 | Fork ................................... 52/220.4 X |
| 4,178,469 | 12/1979 | Fork ................................... 52/220.4 X |
| 4,194,332 | 3/1980 | Fork ...................................... 52/220.4 |
| 4,603,523 | 8/1986 | Albrecht et al. ........................ 52/220.4 |
| 4,726,159 | 2/1988 | Stohs ................................. 52/220.4 X |
| 4,741,134 | 5/1988 | Stohs ................................. 52/220.4 X |
| 4,781,001 | 11/1988 | Ryan ..................................... 52/220.4 |
| 4,845,908 | 7/1989 | Stohs ................................. 52/220.4 X |
| 5,140,791 | 8/1992 | Kimbrough ............................ 52/220.4 |
| 5,467,565 | 11/1995 | Bowman et al. ....................... 52/220.1 |

*Primary Examiner*—Carl D. Friedman
*Assistant Examiner*—Beth Aubrey
*Attorney, Agent, or Firm*—Meroni & Meroni

[57] ABSTRACT

An electrical wiring distribution system adapted for securement with a metal floor structure is provided. The system includes a hatch structure secured to a cellular floor structure. The hatch structure has a housing having an interior portion therewithin and an open bottom end. The housing has opposed sidewalls disposed transverse to the enclosed metal cells and bottom portions extending downwardly in close adjacency with channelways of the floor structure to prevent ingress of concrete into the interior portion. The housing has a pair of side portions having edges forming an access opening in communication with the interior portion of the housing. A divider structure is provided in the interior portion of the housing for dividing the interior portion of the housing into at least a pair of sections. The housing has an upper flange defining a top access opening. A fire retardant member is provided which is sized and adapted for extending about the upper flange between the housing and a ring assembly removably secured to the housing. The ring assembly being adapted to receive a cover plate removably secured thereto. A generally rectangular shaped duct structure defines a raceway extending therethrough. The raceway has an inlet opening in communication with the access opening of the housing. Main power and communication lines extending through the floor structure are accessible through the hatch structure for extension in the duct structure.

42 Claims, 5 Drawing Sheets

ELECTRICAL FLOOR HATCH AND WIRING SYSTEM FOR A CONCRETE FLOOR STRUCTURE

BACKGROUND OF THE INVENTION

1. Field of the Invention

The present invention relates generally to an electrical floor hatch and wiring distribution system. More particularly, the invention pertains to an electrical floor hatch and wiring distribution system secured to a metal floor structure and embedded in a concrete slab.

2. Description of the Prior Art

Various prior art electrical floor structures and wiring distribution systems are known in the art. In general, such structures and systems are secured to a metal floor structure of a building during construction. A layer of concrete is supported by the floor structure and embeds the structure or system within. The wiring systems provide a means to distribute various power and communication lines throughout a building with the floor structures providing a point of access to the lines.

A commonly used system in building construction utilizes electrical cable trenches in combination with metal cellular flooring having enclosed metal cells. For example, such an electrical cable trench is disclosed in U.S. Pat. No. 3,721,051 issued to Fork. The trenches extend perpendicularly across the metal cells and are provided with cover plates that lay within a common plane with a top surface of the concrete floor. These trench systems suffer from a distinct disadvantage in that the installation is labor intensive which results in added construction costs.

The use of cellular flooring with prior art wiring systems is very popular in modern building construction. However, such flooring has several disadvantages. The first disadvantage involves an added risk factor during construction. Cellular flooring is similar to composite flooring except that cellular flooring has a flat metal portion that extends across the entire bottom side of the flooring. As a result, cellular flooring weighs and costs considerably more than composite flooring. During construction, the added weight of cellular flooring can create a safety concern for construction workers who are balanced upon a frame building made of steel beams and are carrying a length this heavy flooring.

A second disadvantage of cellular flooring involves fire proofing. A floor structure must be capable of containing a fire burning from below for a particular length of time. To gain a proper fire rating as may be needed, cellular flooring is coated on its bottom side with a fire proofing insulation. This insulation adds yet a further disadvantage in cost in comparison to composite flooring that does not typically require insulation in order to receive an equal fire rating.

As will be described in greater detail hereinafter, the electrical floor hatch and wiring system of the present invention differs from those previously proposed and employs a number of novel features that render it highly advantageous over the prior art.

SUMMARY OF THE INVENTION

Accordingly, it is an object of this invention to provide an improved electrical wiring distribution system for use in a concrete floor structure.

Another object of this invention is to provide an electrical system having a two hour fire rating to contain a fire burning from below and shield an upper portion of an electrical floor hatch from heat transferred by conduction and radiation.

Another object of this invention is to provide an electrical wiring system having main communication and power lines extending through a metal cellular floor structure where duct structures are turned 90° in comparison to prior art systems and extend in a plane above the floor structure.

Still another object of this invention is to provide an electrical wiring system that can be used in combination with composite flooring to significantly reduce construction costs.

Yet another object of this invention is to provide an electrical wiring system that does not detract from structural capabilities of the floor and is both economical and easy to install.

To achieve the foregoing and other objectives, and in accordance with the purposes of the present invention an electrical wiring distribution system adapted for securement with a metal floor structure is provided. The metal floor structure includes an elongated portion of cellular floor structure having channelways defmed between enclosed metal cells extending generally parallel to one another. The cellular floor structure extends across and is supported by beam structures disposed perpendicular to the elongated portion of cellular floor structures.

The system includes a hatch structure secured to the cellular floor structure. The hatch structure has a housing having an interior portion therewithin and an open bottom end. The housing has opposed sidewalls disposed transverse to the enclosed metal cells and bottom portions extending downwardly in close adjacency with the channelways to prevent ingress of concrete into the interior portion. The housing has a pair of side portions extending perpendicular between respective sidewalls. Each side portion extends parallel and adjacent to a top portion of a respective cell. Each side portion has edges forming an access opening in communication with the interior portion of the housing. A divider structure is provided in the interior portion of the housing for dividing the interior portion of the housing into at least a pair of sections. The housing has an upper flange defining a top access opening. A fire retardant member is provided which is sized and adapted for extending about the upper flange between the housing and a ring assembly removably secured to the housing. The ring assembly being adapted to receive a cover plate removably secured thereto. A generally rectangular shaped duct structure defines a raceway extending therethrough. The raceway has an inlet opening in communication with the access opening of the housing.

In accordance with an aspect of the invention, an electrical floor hatch structure adapted for securement with a cellular floor structure is provided. The hatch structure includes a housing having an interior portion therewithin and an open bottom end adapted for receiving ingress of wires within the housing. The housing has opposed sidewalls disposed transverse to enclosed metal cells of the floor structure and has bottom portions extending downwardly in close adjacency with channelways to prevent ingress of concrete into an interior portion of the hatch structure. The housing has a pair of side portions extending perpendicular between respective sidewalls. The side portions have edges forming an access opening in communication with the interior portion of the housing. A divider structure is provided in the interior portion of the housing for dividing the housing into at least a pair of sections. The housing has an upper flange defining a top access opening. A fire retardant member is sized and adapted for extending about the upper flange between the housing and a ring assembly removably secured to the housing. The ring assembly being adapted to receive a cover plate removably secured to the ring assembly.

In accordance with another aspect of the invention, a layer of fireproofing material is sized and configured for removable engagement within the ring assembly. The material is formed of intumescent material and is adapted to expand under fire conditions to generally fill the interior of the housing.

Other objects, features and advantages of the invention will become more readily apparent upon reference to the following description when taken in conjunction with the accompanying drawings, which drawings illustrate several embodiments of the invention.

DETAILED DESCRIPTION OF THE PREFERRED EMBODIMENT

Figure 1:
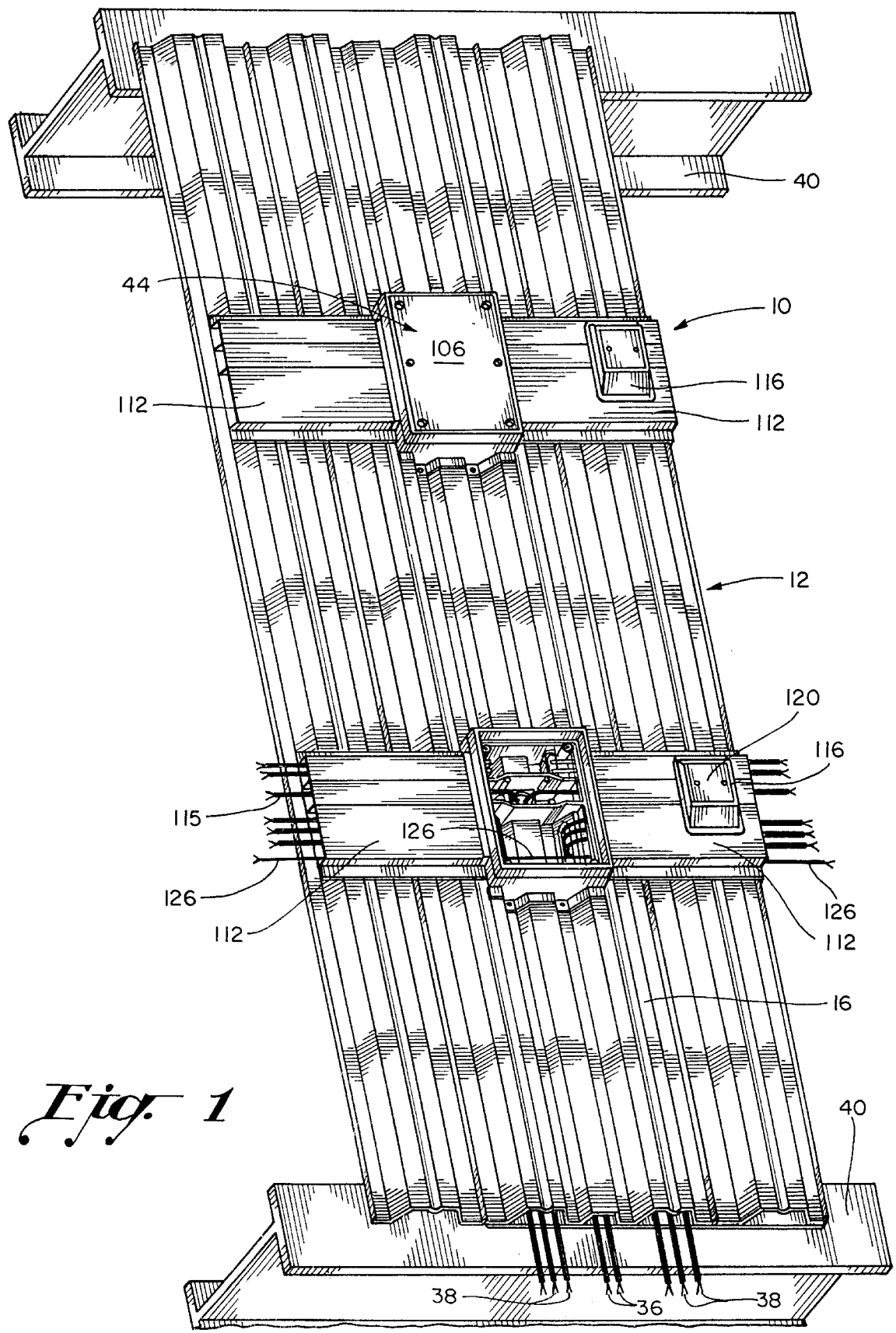
FIG. 1 is a perspective view of an electrical wiring system made in accordance with the teachings of the present invention.
Figure 3:
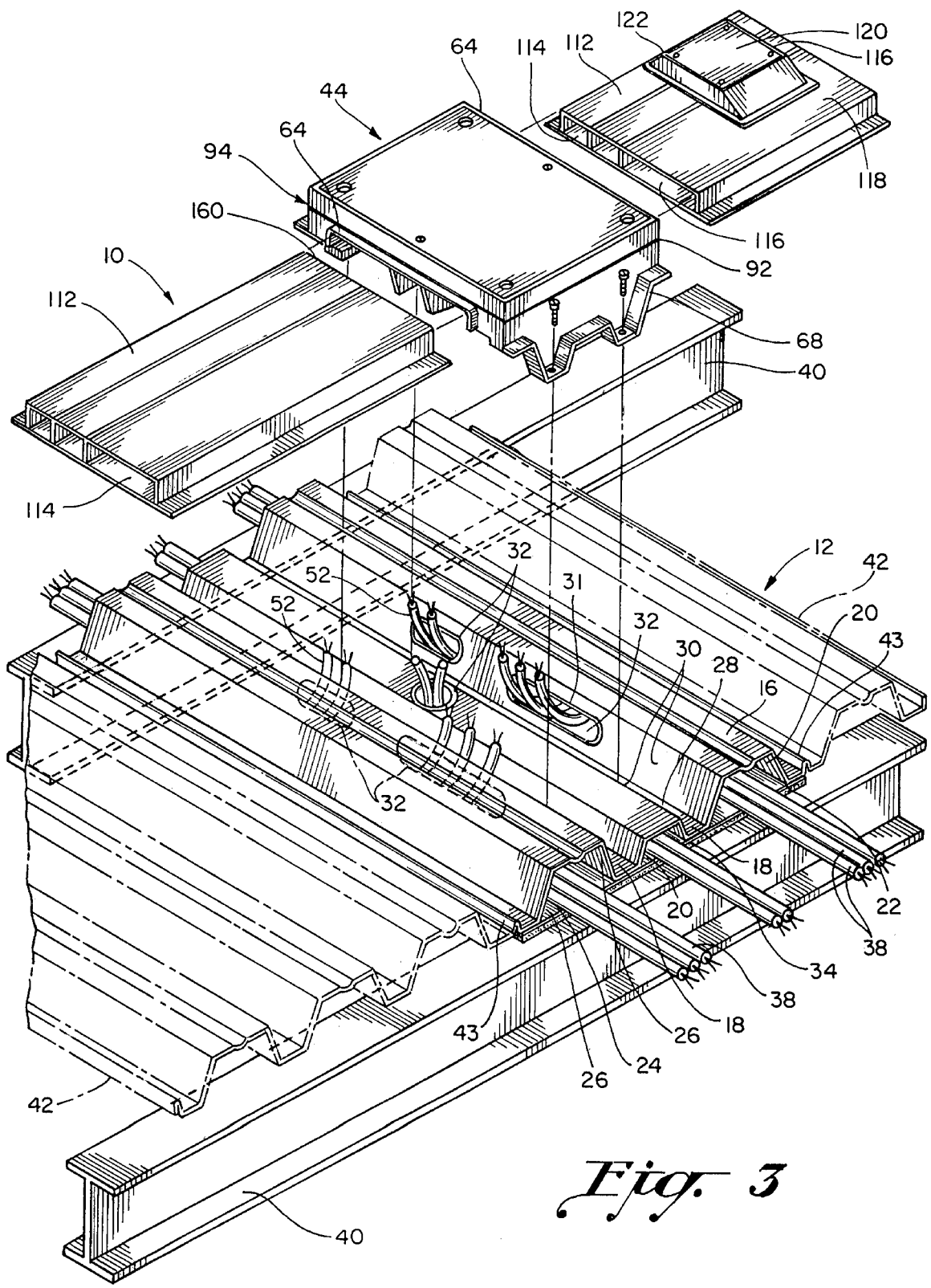
FIG. 3 is a perspective view of an electrical wiring system.

Referring now to the drawings, an electrical wiring distribution system 10 is illustrated in FIGS. 1 and 3. The electrical wiring distribution system 10 is adapted for securement with a metal floor structure 12 and embedment in a concrete slab 14 (FIG. 4) supported by the metal floor structure 12.

The metal floor structure 12 includes an elongated portion of cellular floor structure 16 having channelways 18 defined between enclosed metal cells 20 extending generally parallel to one another. The cells 20 are formed by a top wall 22, a bottom plate 24, and opposed side cell walls 26. The channelways 18 have a bottom wall 28 and opposed outwardly inclined side walls 30. The cells 20 have pre-punched holes or openings 32 providing access into the cells 20. Grommets 31 are inserted into the opening 32 to provide grommeted openings.

In a preferred embodiment, the cellular floor structure 16 includes an enclosed power cell 34 having a reduced height in comparison to enclosed metal cells 20 extending about either sides of the power cell 34. Main power lines 36 are extended through the power cell 34 with main communication lines 38 extending through the cells 20 on opposite sides of the power cell 34.

The cellular floor structure 16 extends across and is supported by beam structures 40 disposed perpendicular to the cellular floor structures 16. The beam structures 40 are typically formed of steel I-beam members and are part of the building's main frame support. Composite metal floor structure 42 can be attached along opposite sides 43 of the cellular floor structure 16. Composite metal floor structure 42 has weight and costs advantages over the use of cellular type flooring over an entire floor.

Figure 2:
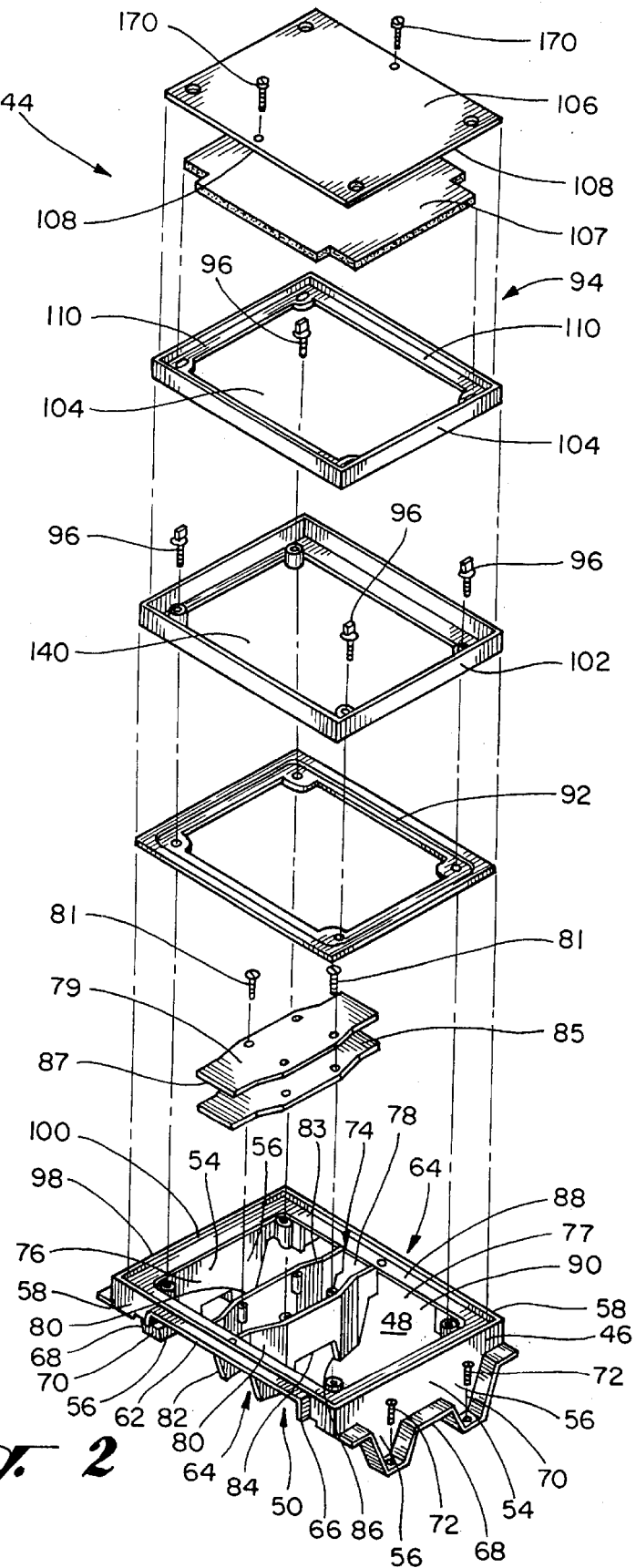
FIG. 2 is an exploded perspective of view an electrical floor hatch structure of the present invention.

A plurality of hatch structures 44 are secured to the cellular floor structure to provide access points through the openings 32 to the main power lines 36 and main communication lines 38 extending vertically below. Referring to FIG. 2, each hatch structure 44 includes a housing 46 formed of cast aluminum alloy having an interior portion 48 therewithin and an open bottom end 50 adapted to receive wires 52 (FIG. 3) from the main lines 36, 38.

The housing 46 includes opposed sidewalls 54 disposed transverse to the enclosed metal cells 20 and have bottom portions 56 extending downwardly in close adjacency with the channelways 18 to prevent ingress of concrete into the interior portion 48 when the concrete slab 14 is poured (FIG. 1). A pair of side portions 58 extend perpendicular between respective sidewalls 54. Each side portion 58 extends parallel and adjacent to a top portion 60 of a respective cell 20. Each side portion 58 has edges 62 forming an access opening 64 in communication with the interior portion 48 of the housing 46. The edges 62 of each side portion 58 extend outwardly to form a receiving flange 66 which further prevents the ingress of concrete.

Each sidewall 54 has an outwardly extending flange 68 along a bottom edge 70 of the sidewall 54. Screws 72 extending through the flange 68 for securing the hatch structure 44 to the cellular floor structure 16 (FIG. 1). A bead of silicon may be applied between the flange 68 and the cellular floor structure 16 to further prevent ingress of poured concrete.

A divider structure 74 is attached in the interior portion 48 of the housing 46 for dividing the interior portion 48 of the housing 46 into at least a pair of sections or compartments. Preferably, the housing is divided into a pair of spaced apart first and second communication sections 76, 77 and a power section 78 therebetween. The power section 78 includes a pair interior divider walls 80. Each divider wall 80 has a bottom portion 82 in close adjacency with the channelways 18. The bottom portion 82 has cell receiving edges 84 defining an opening 86 to receive the power cell 34 of the cellular floor structure 16 therethrough. An opening 32 on the power cell 34 is typically 2½ inches. Hence, the power section 78 has a diameter of approximately 3 inches to allow access into this opening. The divider walls 80 are inwardly converging so that the communication sections 76, 77 have increase size for communication with oval shaped opening 32 of the cells 20 on opposite sides of the power cell 34.

A power section cover 79 is removably secured to the power section 78 with screws 81 to enclose a top portion 83 of the power section 78. A layer of fireproofing material 85 formed of intumescent material is secured to an underside surface 87 of the power section cover 79 with adhesive. When exposed to fire conditions, the intumescent material, of conventional type, will foam and expand to fill the power section 78.

Figure 4:
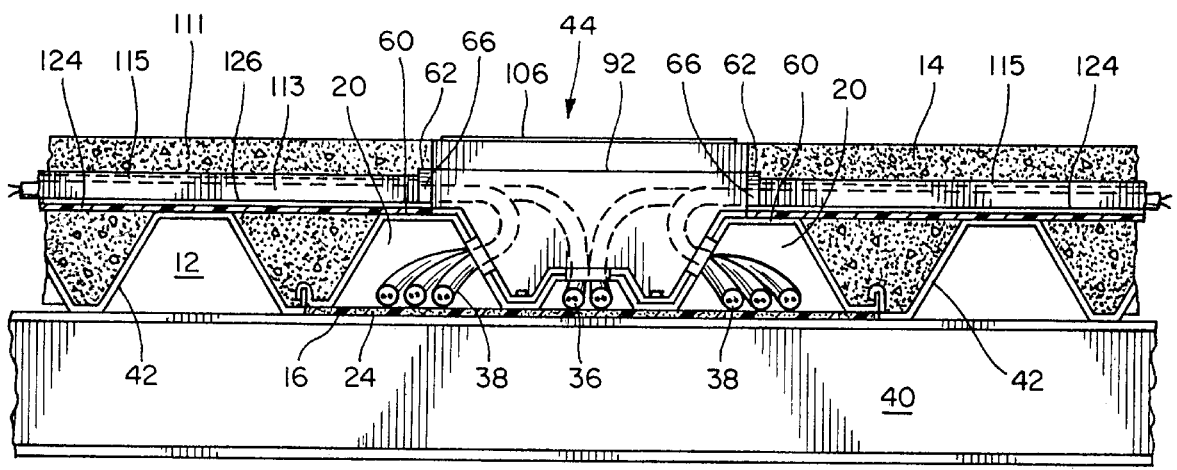
FIG. 4 is a side view of the present invention embedded in a concrete slab.

Preferably, the power section 78 is formed off-center within the housing 46 so that the first and second communication sections 76, 77 and power section 78 is only in vertical alignment with the pre-punch holes or openings 32 when the housing 46 is secured to the cellular floor structure 16 in a pre-determined position (FIG. 4). This provides for fail safe installation of the hatch structures 44 since the structures 44 can only be correctly installed in one direction.

The housing has an upper flange or shoulder 88 defining a top rectangular shaped access opening 90 into the interior portion 48 of the housing 46. A fire retardant member or fiber spacer 92 is sized and adapted for extending about the upper flange 88 between the housing 46 and a metal rectangular shaped ring assembly 94 removably secured to the housing 46 with adjustment screws 96. A ridge 98 extending around an outer edge 100 of the upper flange 88 may be used to hold the member 92 in place before connection with the ring assembly 94. The member 92 serves two functions. It both provides heat insulation from the housing 46 to the ring assembly 94 and the thickness of the member 92 allows for adjustment of the ring assembly 94 to adjust for different heights of concrete.

In a preferred embodiment, the ring assembly 94 includes a generally rectangular upper retainer ring 102 and an inner leveling ring 104 sized for nested engagement within the upper retainer ring 102. The ring assembly 94 defines an upper opening 104 in communication with the access opening 90. The ring assembly 94 is adapted to receive a cover plate 106 removably secured with screws 107 thereto with outer edges 108 of the cover plate 106 being in nested engagement with receiving ridges 110 of the ring assembly 94. The cover plate 106 is disposed in a common plane with an upper surface level 111 of the concrete slab 14 (FIG. 4).

A layer of fireproofing material 107 is sized and configured for removable engagement within the ring assembly 94 for extending across the upper opening 104 with edges of the material 107 in supported engagement about the upper flange 88. The layer of fireproofing material 107 is formed of intumescent material of conventional type and is adapted to expand under fire conditions to generally fill the interior portion 48 of the housing 46.

Figure 6:
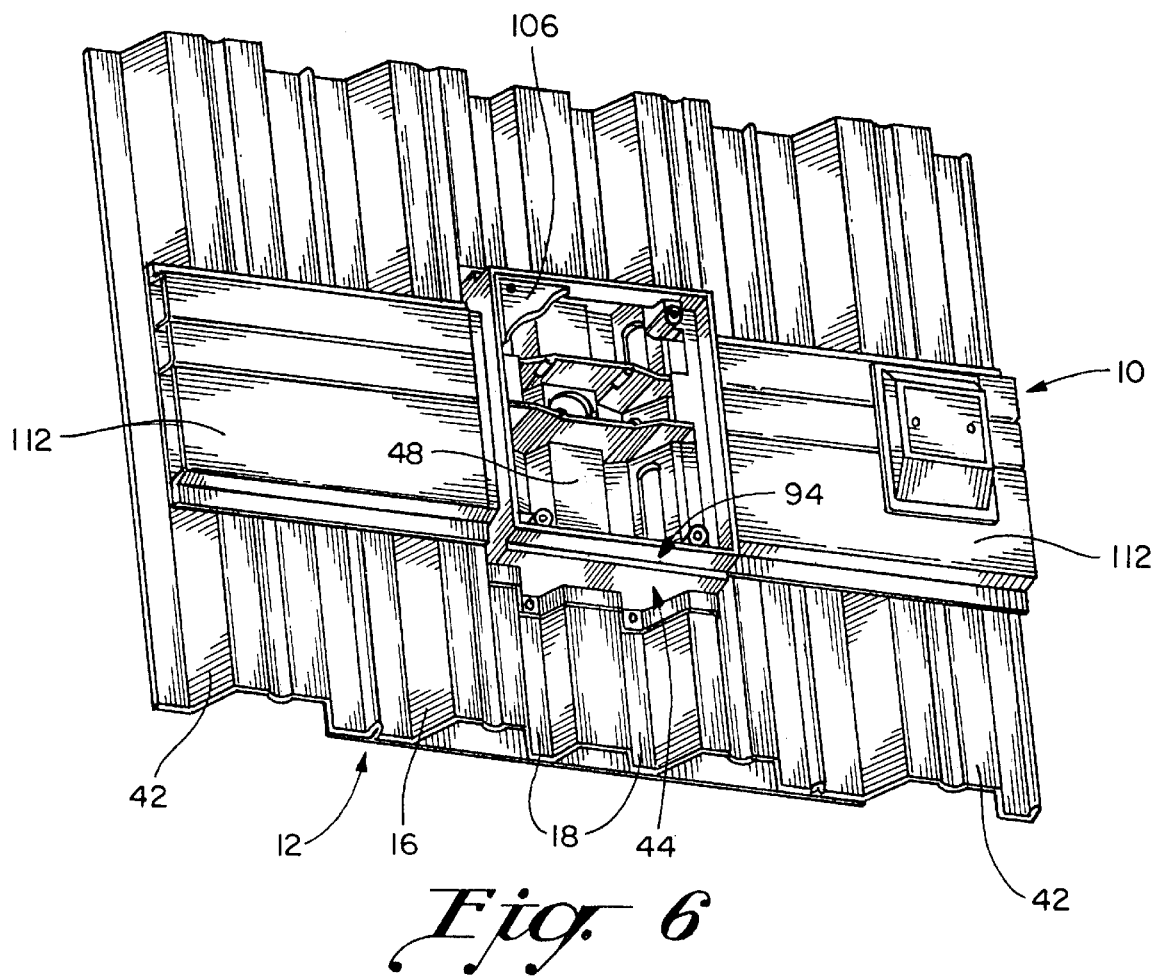
FIG. 6 is a perspective view of an alternative embodiment of the present invention.

In an alternative embodiment illustrated in FIG. 6, the upper retainer ring 102 of the ring assembly or portion 94 is formed integral with the housing 46 as a single piece whereby the fire retardant member 92 is not used. The upper retainer ring 102 of this embodiment is adapted for connection with an inner leveling ring 104 and cover plate 106 similar to that previously shown and described or alternatively may be used without the inner leveling ring 104 to receive the cover plate removably secured thereto. This alternative embodiment does not utilize the fire retardart member 92 or the fireproofing material 85,107 and would accordingly be installed in structures where a specific fire rating was not necessary.

Referring to FIG. 3, a generally rectangular shaped duct structure 112 defines a raceway 114 extending therethrough. The raceway 114 of the duct structure 112 has an inlet opening 116 for securement in communication with the access opening 64 of the housing 46. The duct structure 112 extends perpendicular from the metal cells 20 across the metal floor structure 12. Preferably, the duct structure 112 is a metal tri-cell structure to provide separate cells extending from each of the three sections of the housing 46. The duct structure 112 has access inserts 116 connected to a top surface 118 of the duct structure 112 for providing access into the raceway 114 and the wires or extension lines 115 extending therethough (FIG. 4). The inserts 1 16 are positioned at desired selected lengths therebetween. The inserts 116 have an access cover plate 120 removably secured to an upper portion 122 of the inserts 116 in a common plane with an upper surface level of the concrete slab 14. A flat shield member or layer 124 formed of insulation material of conventional type 124 (FIG. 4) may be provided to extend between a bottom surface 126 of the duct structure 112 and the metal floor structure 12 to act as a thermal barrier for insulating the duct structure 112 from the metal floor structure 12 in the event of a fire burning from below.

Figure 5:
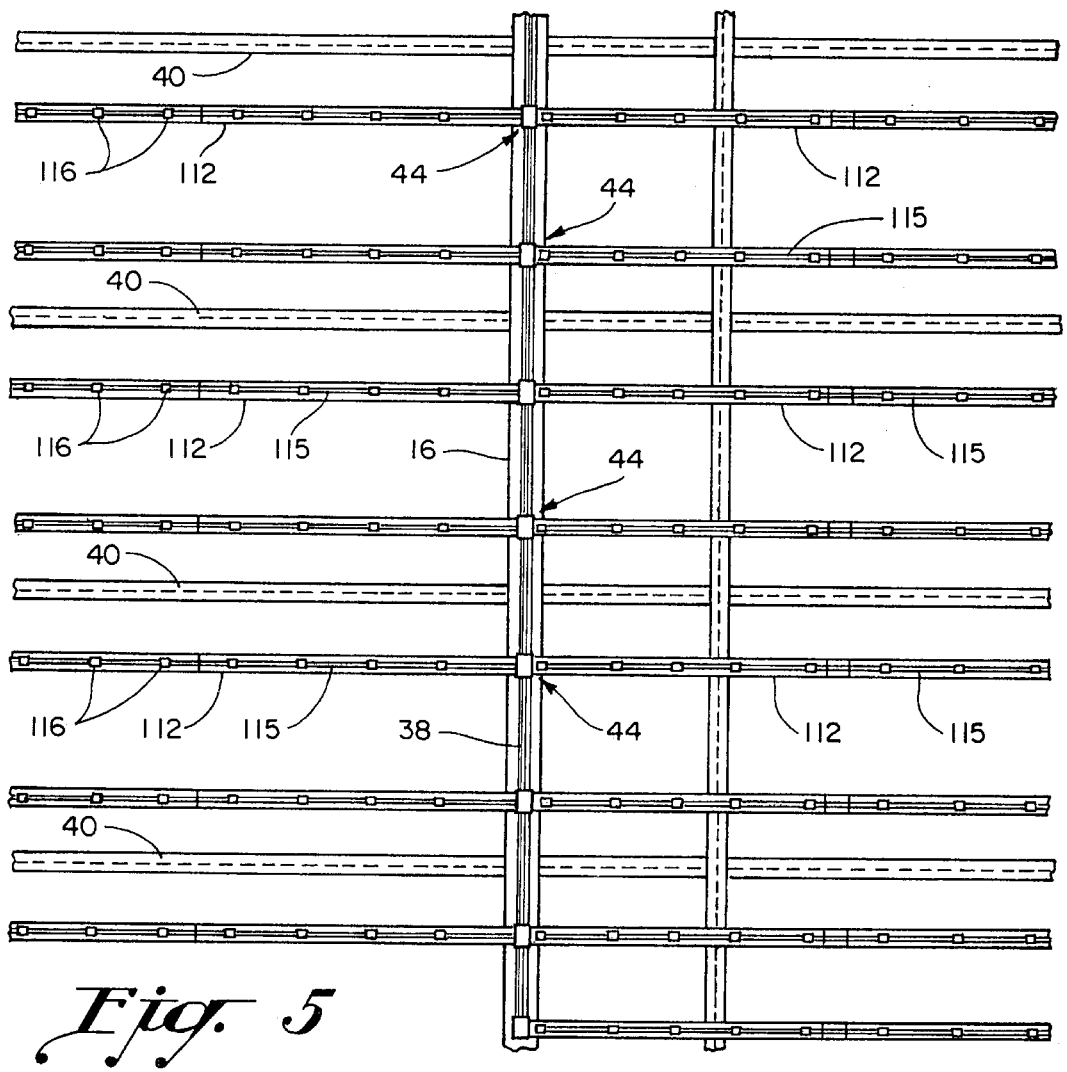
FIG. 5 is a diagrammatic top plan view of the present invention.

Referring to FIG. 5, a diagrammatic top plan view of the system 10 is illustrated. A plurality of hatch structures 44 are secured in alignment to the elongated portion of cellular floor structure 16 that is supported by perpendicular spaced apart beam structures 40. The hatch structures 44 can be secured at random in accordance with a builder's discretion in that the installation of the hatch structures 44 does not interfere with other structure. This provides added flexibility over prior art systems. Each hatch structure 44 provides access to the main lines 36, 38 extending through the cellular floor structure 16. From each hatch structure 44, duct structures 112 extending outwardly with space apart inserts 116 providing access to the extension lines 115 connected from the main lines 36, 38.

In prior art cellular floor systems, a length of cellular flooring having cells within is attached to a length of composite blend flooring with this fixed pattern of cellular flooring and composite blend flooring continuing throughout the floor of a structure. Hence, all of the cells of such a system are at fixed spaced apart distances from one another. The present invention solves this problem by extending the duct structures 112 in a plane 113 above the metal floor structure 12 at 90° across the cells 20 with the hatch structures 44 being positionable at any desired spacing therebetween. Therefore, there are no restrictions to the possible spacing between the duct structures or cells 112 of the present invention.

In another feature of the present invention shown in FIG. 1, networking wires 126 may be extended through the duct structures 12 to interconnect users to a common network. The wires 126 are extendible through the interior portion 48 of the hatch structure 44 by use of the access openings 64. Therefore, networking wires 126 can be easily installed along a common line of duct structures 12 and freely fed through a hatch structure 44 without having to feed the wires through the cellular floor structure 16.

In the event of a fire burning from below the metal floor structure, the composite metal floor structure 42 will provide protection for the floor above since the structure 42 will transfer heat to the concrete slab 14 to dispel the heat. With respect to the cellular floor structure 16, the bottom plate 24 is not directly tied to the concrete slab 14 to dispel heat. Here, heat will build up and travel through the cells 20 to a hatch structure. The layers of fireproofing material 85, 107 will foam and expand to prevent the transfer of radiant heat and the fire retardant member 92 will prevent the transfer of conductive heat to the cover plate 106.

It is important to note that the neither the cellular floor structure 16 or composite floor structure 42 for use with the present invention requires an undercoating of fire proofing insulation which is a significant cost savings over cellular floor systems of the prior art that require such insulation in order to achieve the same two-hour fire rating as the present invention.

Although the invention has been described by reference to some embodiments it is not intended that the novel device be limited thereby, but that modifications thereof are intended to be included as falling within the broad scope and spirit of the foregoing disclosure, the following claims and the appended drawings.

I claim:

1. An electrical wiring distribution system in combination with a metal floor structure, said system being securable to said metal floor structure and embedded in a concrete slab supported by the metal floor structure, the system comprising: the metal floor structure including an elongated portion of cellular floor structure having channelways defined between enclosed metal cells extending generally parallel to one another, the cellular floor structure extending across and supported by beam structures disposed perpendicular to the elongated portion of cellular floor structures, a plurality of hatch structures secured to the cellular floor structure, each hatch structure including a housing having an interior portion therewithin and an open bottom end, the housing including opposed sidewalls disposed transverse to the enclosed metal cells and having bottom portions extending downwardly in close adjacency with the channelways to prevent ingress of concrete into the interior portion, the housing having a pair of side portions extending perpendicular between respective sidewalls, each side portion extending parallel and adjacent to a top portion of a respective cell, each side portion having edges forming an access opening in communication with the interior portion of the housing, divider means in the interior portion of the housing for dividing the interior portion of the housing into at least a pair of sections, the housing having an upper flange defining a top access opening, a fire retardant member sized and adapted for extending about the upper flange between the housing and a ring assembly removably secured to the housing, the ring assembly defining an upper opening, the ring assembly being adapted to receive a cover plate removably secured thereto, a generally rectangular shaped duct structure defining a raceway extending therethrough, the raceway of the duct structure having an inlet opening in communication with the access opening of the housing, the duct structure extending perpendicular from the metal cells across the metal floor structure.

2. The electrical wiring distribution system of claim 1, wherein the duct structure has access means connected to a top surface of the duct structure for providing access into the raceway.

3. The electrical wiring distribution system of claim 1, further comprising shield means extending between a bottom surface of the duct structure and the metal floor structure for insulating the duct structure from the metal floor structure.

4. The electrical wiring distribution system of claim 2, wherein the access means has an access cover plate removably secured to an upper portion of the access means.

5. The electrical wiring distribution system of claim 1, wherein the enclosed metal cells have grommeted openings in communication with the interior portion of the housing to allow ingress of power and communication lines extending though the enclosed metal cells into the hatch structure.

6. The electrical wiring distribution system of claim 1, wherein the metal floor structure includes composite metal floor structure secured along opposite sides of the cellular floor structure.

7. The electrical wiring distribution system of claim 1, further comprising a layer of fireproofing material sized and configured for removable engagement within the ring assembly for extending across the upper opening.

8. The electrical wiring distribution system of claim 7, wherein the layer of fireproofing material is formed of intumescent material adapted to expand under fire conditions to generally fill the interior portion of the housing.

9. The electrical wiring distribution system of claim 8, wherein each sidewall has an outwardly extending flange along a bottom edge of the sidewall and fastening means extending through the flange for securing the hatch structure to the cellular floor structure.

10. The structure of claim 1, wherein the divider means includes means for dividing the housing into a pair of spaced apart first and second communication sections and a power section therebetween.

11. An electrical wiring distribution system in combination with a metal floor structure, said system being securable to said metal floor structure and embedded in a concrete slab supported by the metal floor structure, the metal floor structure including an elongated portion of cellular floor structure having channelways defined between enclosed metal cells extending generally parallel to one another, the system comprising: a hatch structure secured to the cellular floor structure, the hatch structure including a housing having an interior portion therewithin and an open bottom end, the housing including opposed sidewalls disposed transverse to the enclosed metal cells and having bottom portions extending downwardly in close adjacency with the channelways to prevent ingress of concrete into the interior portion, the housing having a pair of side portions extending perpendicular between respective sidewalls, each side portion extending parallel and adjacent to a top portion of a respective cell, each side portion having edges forming an access opening in communication with the interior portion of the housing, divider means in the interior portion of the housing for dividing the interior portion of the housing into at least a pair of sections, the housing having an upper flange defining a top access opening, a fire retardant member sized and adapted for extending about the upper flange between the housing and a ring assembly removably secured to the housing, the ring assembly defining an upper opening, the ring assembly being adapted to receive a cover plate removably secured thereto, a generally rectangular shaped duct structure defining a raceway extending therethrough, the raceway of the duct structure having an inlet opening in communication with the access opening of the housing, the duct structure extending perpendicular from the metal cells across the metal floor structure.

12. The system of claim 11, further comprising a layer of fireproofing material sized and configured for removable engagement within the ring assembly for extending across the upper opening.

13. The system of claim 12, wherein the layer of fireproofing material is formed of intumescent material adapted to expand under fire conditions to generally fill the interior portion of the housing.

14. The system of claim 12, wherein the duct structure has access means connected to a top surface of the duct structure for providing access into the raceway, the duct structure having networking wires extendible therethough in a plane above the metal floor structure, the networking wires being freely extendible through the hatch structure.

15. The system of claim 14, further comprising shield means extending between a bottom surface of the duct structure and the metal floor structure for insulating the duct structure from the metal floor structure.

16. The system of claim 11, wherein a plurality of hatch structures are secured to the cellular floor structure at desired selectable lengths therebetween, duct structures extending from the hatch structures at variable distances between one another corresponding to the selectable lengths between the hatch structures.

17. The system of claim 16, wherein the enclosed metal cells have grommeted openings in communication with the interior portion of the housing to allow ingress of power and communication lines extending though the enclosed metal cells into the hatch structure.

18. The system of claim 17, wherein the metal floor structure includes composite metal floor structure extending outwardly along opposite sides of the cellular floor structure.

19. An electrical floor hatch structure in combination with a cellular floor structure, said cellular floor structure having channelways defined between enclosed metal cells extending parallel to one another, the hatch structure comprising:

a housing having an interior portion therewithin and an open bottom end adapted for receiving ingress of wires within the housing, the housing including opposed sidewalls disposed transverse to the enclosed metal cells and having bottom portions extending downwardly in close adjacency with the channelways to prevent ingress of concrete into an interior portion of the hatch structure, the housing having a pair of side portions extending perpendicular between respective sidewalls, each side portion extending parallel and adjacent to a top portion of a respective cell, the side portions having edges forming an access opening in communication with the interior portion of the housing, divider means in the interior portion of the housing for dividing the housing into at least a pair of sections, the housing having an upper flange defining a top access opening, a fire retardant member sized and adapted for extending about the upper flange between the housing and a ring assembly removably secured to the housing, the ring assembly defining an upper opening, the ring assembly being adapted to receive a cover plate removably secured to the ring assembly.

20. The structure of claim 19, further comprising a layer of fireproofing material sized and configured for removable engagement within the ring assembly for extending across the upper opening.

21. The structure of claim 20, wherein the layer of fireproofing material is formed of intumescent material adapted to expand under fire conditions to generally fill the interior portion of the housing.

22. The structure of claim 19, wherein each sidewall has an outwardly extending flange along a bottom edge of the sidewall and fastening means extending through the flange for securing the hatch structure to the cellular floor structure.

23. The structure of claim 19, wherein edges of each side portion extend outwardly to form a receiving flange.

24. The structure of claim 19, wherein the housing is formed of cast iron.

25. The structure of claim 19, wherein the divider means includes means for dividing the housing into a pair of spaced apart first and second communication sections and a power section therebetween.

26. The structure of claim 25, further comprising a power section cover removably secured to the power section to enclose a top portion of the power section.

27. The structure of claim 26, further comprising a layer of fireproofing material formed of intumescent material is secured to an underside surface of the power section cover.

28. The structure of claim 25, wherein the cellular floor structure has pre-punched holes and the power section is formed off-center within the housing to that the first and second communication sections and power section is in vertical alignment with the pre-punch holes when the housing is secured to the cellular floor in a pre-determined position.

29. The structure of claim 19, wherein the ring assembly includes a generally rectangular upper retainer ring and an inner leveling ring sized for nested engagement within the upper retainer ring.

30. A fire resistant electrical floor hatch structure in combination with a cellular floor structure, said cellular floor structure having channelways defined between enclosed metal cells extending parallel to one another, the hatch structure comprising: a housing having an interior portion therewithin and an open bottom end adapted for receiving ingress of wires within the housing, the housing including opposed sidewalls disposed transverse to the enclosed metal cells and having bottom portions extending downwardly in close adjacency with the channelways to prevent ingress of concrete into an interior portion of the hatch structure, the housing having a pair of side portions extending perpendicular between respective sidewalls, each side portion extending parallel and adjacent to a top portion of a respective cell, the side portions having edges forming an access opening in communication with the interior portion of the housing, divider means in the interior portion of the housing for dividing the housing into at least a pair of sections, the housing having an upper flange defining a top access opening, a fire retardant member sized and adapted for extending about the upper flange between the housing and ring assembly removably secured to the housing, the ring assembly defining an upper opening, a layer of fireproofing material sized and configured for removable engagement within the ring assembly for extending across the upper opening, the ring assembly having outer edges adapted to receive a cover plate removably secured to the ring assembly.

31. The structure of claim 30, wherein the layer of fireproofing material is formed of intumescent material adapted to expand under fire conditions to generally fill the interior portion of the housing.

32. The structure of claim 30, wherein each sidewall has an outwardly extending flange along a bottom edge of the sidewall and fastening means extending through the flange for securing the hatch structure to the cellular floor structure.

33. The structure of claim 30, wherein the divider means includes means for dividing the housing into a pair of spaced apart first and second communication sections and a power section therebetween.

34. The structure of claim 33, wherein the power section has a diameter of at least 3 inches and includes a pair interior divider walls, each divider wall having a bottom portion in close adjacency with the channelways, the bottom portion having cell receiving edges defining an opening to receive a power cell of the cellular floor structure therethrough, the power cell extending parallel between channelways on opposites of the power cell.

35. The structure of claim 33, further comprising a power section cover removably secured to the power section to enclose a top portion of the power section.

36. The structure of claim 35, further comprising a layer of fireproofing material formed of intumescent material is secured to an underside surface of the power section cover.

37. The structure of claim 36, wherein the cellular floor structure has pre-punched holes and the power section is formed off-center within the housing to that the first and second communication sections and power section is in vertical alignment with the prepunch holes when the housing is secured to the cellular floor in a pre-determined position.

38. The structure of claim 30, wherein the ring assembly includes a generally rectangular upper retainer ring and an inner leveling ring sized for nested engagement within the upper retainer ring.

39. An electrical wiring distribution system in combination with a metal floor structure, said system being securable to said metal floor structure and embedded in a concrete slab supported by the metal floor structure, the metal floor structure including an elongated portion of cellular floor structure having channelways defined between enclosed metal cells extending generally parallel to one another, the system comprising: a hatch structure secured to the cellular floor structure, the hatch structure including a housing having an interior portion therewithin and an open bottom end, the housing including opposed sidewalls disposed transverse to the enclosed metal cells and having bottom portions extending downwardly in close adjacency with the channelways to prevent ingress of concrete into the interior portion, the housing having a pair of side portions extending perpendicular between respective sidewalls, each side portion having edges forming an access opening in communication with the interior portion of the housing, divider means in the interior portion of the housing for dividing the interior portion of the housing into at least a pair of sections, the housing having a ring assembly defining an upper opening in communication with the interior portion of the housing, the ring assembly being adapted to receive a cover plate removably secured thereto, a generally rectangular shaped duct structure defining a raceway extending therethrough, the raceway of the duct structure having an inlet opening in communication with the access opening of the housing, the duct structure extending perpendicular from the metal cells across the metal floor structure.

40. The system of claim 39, further comprising a layer of fireproofing material sized and configured for removable engagement within the ring assembly for extending across the upper opening.

41. The system of claim 39, wherein a plurality of hatch structures are secured to the cellular floor structure at desired selectable lengths therebetween, duct structures extending from the hatch structures at variable distances between one another corresponding to the selectable lengths between the hatch structures.

42. An electrical floor hatch structure in combination with a cellular floor structure, said cellular floor structure having channelways defined between enclosed metal cells extending parallel to one another, the hatch structure comprising: a housing having an interior portion therewithin and an open bottom end, the housing including opposed sidewalls disposed transverse to the enclosed metal cells and having bottom portions extending downwardly in close adjacency with the channelways to prevent ingress of concrete into an interior portion of the hatch structure, the housing having a pair of side portions extending perpendicular between respective sidewalls, each side portion extending parallel and adjacent to a top portion of a respective cell, the side portions having edges forming an access opening in communication with the interior portion of the housing, divider means in the interior portion of the housing for dividing the housing into at least a pair of sections, the housing having a ring portion defining an upper opening in communication with the access opening of the housing, the ring assembly being adapted to receive a cover plate removably secured thereto.

\* \* \* \* \*